Sept. 26, 1967   M. R. SCHROEDER   3,344,349
APPARATUS FOR ANALYZING THE SPECTRA OF COMPLEX WAVES
Filed Oct. 7, 1963
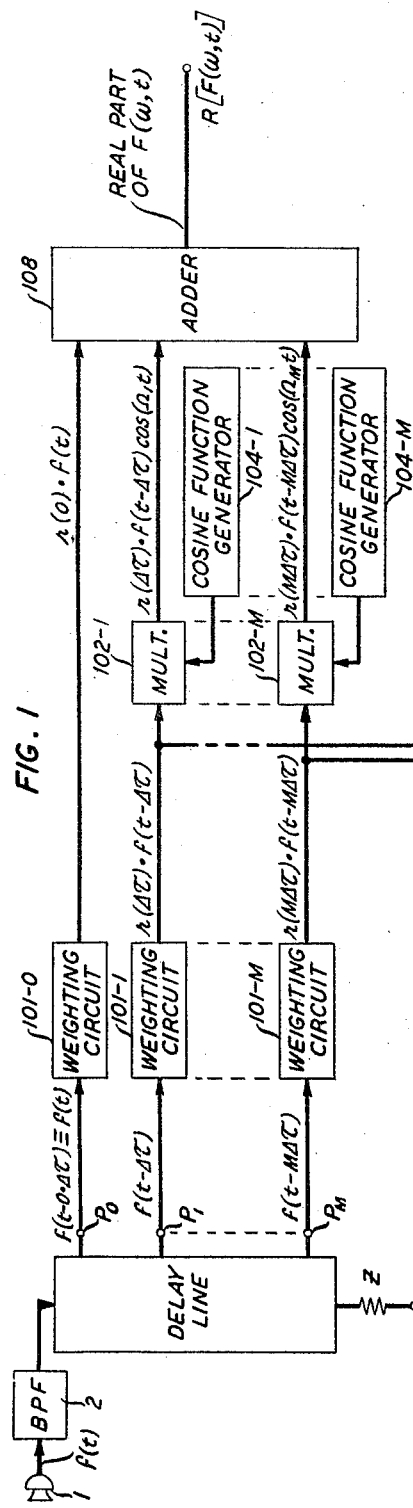
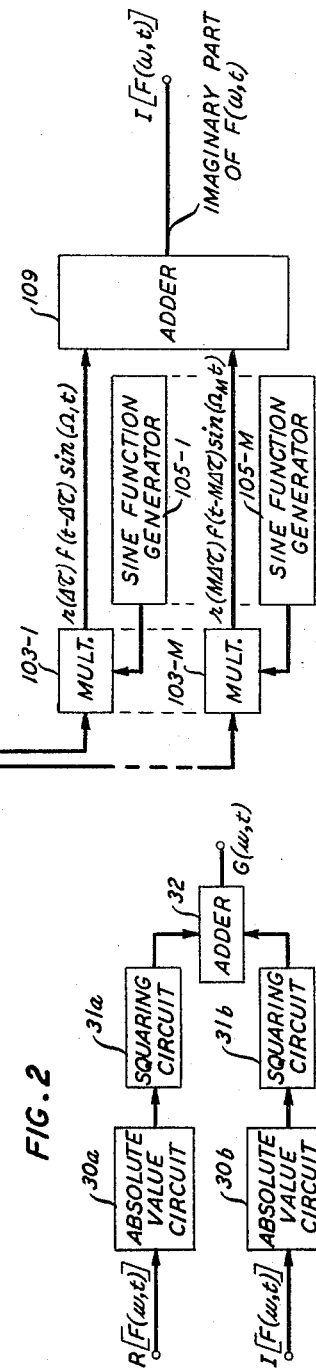
INVENTOR
M. R. SCHROEDER
BY
ATTORNEY

United States Patent Office 3,344,349
Patented Sept. 26, 1967

3,344,349
APPARATUS FOR ANALYZING THE SPECTRA
OF COMPLEX WAVES
Manfred R. Schroeder, Gillette, N.J., assignor to Bell Telephone Laboratories, Incorporated, New York, N.Y., a corporation of New York
Filed Oct. 7, 1963, Ser. No. 314,258
1 Claim. (Cl. 324—77)

This invention relates to the analysis of complex waves, and in particular to apparatus for analyzing the spectra of complex waves.

Most presently available spectrum analyzers may be divided into two groups: heterodyne analyzers and filter bank analyzers. A typical heterodyne analyzer mixes the signal to be analyzed with a variable frequency sine wave from a tunable oscillator, and the resultant difference frequencies are then applied to a fixed frequency bandpass filter which eliminates all but the frequency component to be determined. By adjusting the oscillator to vary the sine wave frequency, the input signal is frequency swept through a fixed frequency filter to produce a succession of frequency components representative of the spectrum of the input signal. This type of analysis produces continuous spectra, but the necessity for tuning the oscillator over a significant range of frequencies means that a relatively long time is required to analyze a comparatively short segment of a signal. For example, nearly five minutes is required to analyze only a few seconds of speech. Faster heterodyne analyzers are available but elaborate schemes are necessary to correct the distortion resulting from the high sweep rate of the input signal through the bandpass filter.

The second type of analyzer generally consists of a stationary bandpass filter bank. The output of each filter corresponds to that component of the spectrum lying within the pass band of the filter. This type of device produces a discrete spectrum and requires many filters for good resolution; however, even a large number of filters cannot produce a continuous spectrum. The advantage of this type of spectrum analyzer is that it operates in real time, that is, the output is instantaneous within the averaging times of the filters.

The spectrum analyzer of the present invention operates in real time and produces continuous spectra without utilizing either heterodyning methods or bandpass filter banks. In this invention, an input signal to be analyzed is delayed by predetermined amounts of time to obtain a plurality of variously delayed samples of the input signal at discrete instants of time within a selected finite time interval. The variously delayed samples are individually weighted by modifying or adjusting the amplitude of each sample in accordance with a suitable weighting function, and the amplitude of each weighted sample is multiplied by a corresponding predetermined cosine function signal to obtain a first group of product signals and by a corresponding predetermined sine function signal to obtain a second group of product signals. By summing the first group of product signals there is obtained a first sum signal representative of the real part of a so-called short-time Fourier transform or complex spectrum of the original input signal, and by summing the second group of product signals there is obtained a second sum signal representative of the imaginary part of the short-time Fourier transform of the input signal.

By choosing the time intervals at which the input signal is to be delayed according to the sampling theorem, the short-time Fourier transform signals obtained in this invention are continuous, and except for the time required to obtain sufficient samples at the beginning of the analysis, the Fourier transform signals of this invention are obtained without further delay.

Another feature of the present invention is the provision for obtaining a signal representative of the power spectrum of an input signal. This is accomplished by developing signals having amplitudes proportional to the absolute value of the amplitude of each of the first and second sum signals mentioned above, raising the amplitude of each of the absolute value signals to the second power, and combining the squared absolute value signals.

The invention will be fully understood from the following detailed description of illustrative embodiments thereof taken in connection with the appended drawings, in which:

FIG. 1 is a schematic block diagram of apparatus embodying certain principles of this invention; and FIG. 2 is a schematic block diagram illustrating equipment for obtaining a signal representative of the short-time power spectrum of an incoming time wave.

*Theoretical considerations*

The Fourier transform or complex spectrum of a function of time, $f(t)$, is defined to be $$F(\omega) \equiv \int_{-\infty}^{\infty} f(t) e^{-j\omega t} dt \tag{1}$$

In practice, this definition is unsuitable for analyzing the Fourier transform of an observable time function such as a speech wave because it requires both integration over an infinite time interval and a knowledge of the future. Also, the definition given by Equation 1 provides only a single complex spectrum of $f(t)$ over the entire time interval, whereas it is often desirable to observe a series of spectra of $f(t)$ over a corresponding succession of relatively short-time intervals in order to obtain information about changes in the spectrum of $f(t)$ with the passage of time. For example, in the case of speech, $f(t)$ is characterized by a series of different sounds, and each speech sound has a distinctive spectrum.

In order to obtain a series of complex spectra of a time function $f(t)$ over a corresponding succession of relatively short-time intervals, it is necessary to define a so-called "short-time" Fourier transform or $F(\omega, t)$, which is a generalization of the Fourier transform, $F(\omega)$, given by Equation 1, $$F(\omega, t) \equiv \int_0^{\tau_M} r(\tau) f(t-\tau) e^{-j\omega \tau} d\tau \tag{2}$$

where $t$ is real time, $\tau$ is a variable of integration, and the integration is performed over a finite time interval extending from 0 to $\tau_M$ seconds. The function $r(\tau)$ is a physically realizable but otherwise arbitrary "weighting function," which is also commonly called a "lag window." It is observed that the short-time Fourier transform defined by Equation 2 indicates a finite integration interval and assumes no knowledge of the future, hence this definition provides a basis for analyzing the spectrum of a time function corresponding to an observable phenomenon.

The definition given by Equation 2 may be rewritten in terms of discrete samples of each of the quantities following the integral sign, so that the finite integration indicated in Equation 2 may be replaced by a finite summation of samples of $f(t)$ at discrete instants of time, denoted $k\Delta\tau$, $k=0, 1 \ldots M$, within the interval from 0 to $\tau_{max} = M\Delta\tau$ seconds, $$F(\omega, t) = \sum_{k=0}^{M} [r(k\Delta\tau) f(t-k\Delta\tau) \cos(\omega k\Delta\tau)$$

$$-j \cdot r(k\Delta\tau) f(t-k\Delta\tau) \sin(\omega k\Delta\tau)] \tag{3}$$

where the cosine terms represent the real part of $F(\omega, t)$ and the sine terms represent the imaginary part of $F(\omega, t)$.

The spacing between sample points, $\Delta\tau$, depends upon the magnitude of the highest frequency present in the spectrum of the time function. Thus if $W_c$ denotes the highest frequency present in the spectrum of the time function, the sampling theorem specifies that the time function is completely specified provided that the sample points are spaced at intervals of $\Delta\tau < 1/2W_c$ seconds. The total number of samples is determined by the particular application of this invention; in the case of the analysis of the pitch of voiced speech sounds, for example, $f(t)$ is characterized by a periodic waveform, and it is ordinarily sufficient to obtain samples of two of the longest anticipated speech periods. By way of example, if $W_c < 3{,}000$ cycles per second and the longest anticipated period is 15 milliseconds, then the sample points may be spaced at intervals of $\tfrac{1}{6}$ millisecond, so that $$0 \cdot \Delta\tau = 0, \quad 1 \cdot \Delta\tau = \tfrac{1}{6}, \quad 2 \cdot \Delta\tau = \tfrac{2}{6} \; \ldots \; M \cdot \Delta\tau = M/6$$

milliseconds, and the total number of samples, exclusive of $0 \cdot \Delta\tau$, is $$\frac{2 \cdot 15}{\tfrac{1}{6}} = 180$$

In this invention, the short-time Fourier transform defined by Equation 3 is represented by a time signal; that is, the short-time Fourier transform is scanned over a selected time interval to produce a time varying signal representative of $F(\omega, t)$. In order to scan the short-time Fourier transform over a selected time interval $\Delta T$, the radian frequency $\omega$ must be made a function of time, for example, $\omega$ is made a linear function of time, $$\omega = \alpha t \qquad (4a)$$

where $\alpha$ is a constant representing the selected scanning rate, so that Equation 3 may be rewritten $$F(\omega = \alpha t, t) = \sum_{k=0}^{M} [r(k\Delta\tau)f(t - k\Delta\tau) \cos(k\alpha\Delta\tau t)$$
$$- j \cdot r(k\Delta\tau)f(t - k\Delta\tau) \sin(k\alpha\Delta\tau t)] \qquad (4b)$$

During a single scan or sweep of the short-time Fourier transform the independent time variable, $t$, in Equation 4a varies over a time interval $\Delta T$ where in order to make a complete analysis, $\Delta T$ is ordinarily chosen so that a single scan is completed before one set of samples $f(t - k\Delta\tau)$, $k = 0, 1 \ldots M$, has been completely replaced by the next set of samples $f[(t + \tau_{\max} + \Delta\tau) - k\Delta\tau]$, that is, $\Delta T \leq \tau_{\max} = M\Delta\tau$. Also, during a single scan the radian frequency $\omega$ in Equation 4a varies over a frequency interval $\Delta W$, extending from a selected low frequency in the spectrum, $W_L$, to a selected high frequency, $W_L + \Delta W$, present in the spectrum of $f(t)$. Therefore the constant $\alpha$ in Equation 4a may be evaluated by substituting the range of variation of $\omega$ and $t$ during a single scan, $$\alpha = \Delta W / \Delta T \qquad (4c)$$

It is observed in Equation 4b that the amplitude of each of the samples of $f(t)$ is modified by multiplication by a time varying sine or cosine function, $\sin(k\alpha\Delta\tau t)$, $\cos(k\alpha\Delta\tau t)$. The radian frequency of the $k$th sine or cosine function may therefore be denoted $\Omega_k$, where $$\Omega_k = k\alpha\Delta\tau \qquad (4d)$$

Substituting Equation 4c for $\alpha$ in Equation 4d, $$\Omega_k = k \frac{\Delta W}{\Delta T} \Delta\tau \qquad (4e)$$

by way of example, the length of a single scanning interval $\Delta T$ may be made equal to the sampling interval, that is, $\Delta T = M\Delta\tau$, so that $$\Omega_k = k(\Delta W / M) \qquad (4f)$$

that is, $\Omega_k$ varies in discrete steps of $(\Delta W/M)$ from zero to $W$; whereas for $\Delta T = M\Delta\tau/2$, that is, for a scanning interval equal to one-half of the sampling intervals, $$\Omega_k = k(2\Delta W/M) \qquad (4g)$$

that is, $\Omega_k$ varies in discrete steps of $(2\Delta W/M)$ from zero to $2W$. It is noted at this point that for many weighting functions it is preferred that $\Delta T$ be equal to one-half of the sampling interval.

The weighting function, $r(k\Delta\tau)$, that appears in Equations 3 and 4b modifies or adjusts the amplitudes of the samples of $f(t)$ in order to make the time signal represent the short-time Fourier transform in any desired manner. Accordingly, any one of the various weighting functions or lag windows described by R. B. Blackman and J. W. Tukey in "The Measurement of Power Spectra From the Point of View of Communications Engineering," Volume 37, Bell System Technical Journal, page 200 (1958), may be employed.

*Apparatus*

Turning now to FIG. 1, this drawing illustrates apparatus for analyzing the short-time Fourier transform of a time function $f(t)$ in accordance with Equation 4b. An incoming wave that is a function of time, $f(t)$, for example, a speech wave from a microphone 1, is limited to a desired frequency band by passing the wave through a conventional bandpass filter 2, following which the band-limited wave is applied to the input terminal of a conventional tapped delay line 10. Filter 2 serves to limit the frequency range of the incoming wave by removing all frequency components of the wave which lie outside the desired range; for example, a speech wave may be limited by filter 2 to a frequency range extending from 0 to $W_c = 3{,}000$ cycles per second.

Delay line 10, which is terminated in a matched impedance Z to prevent reflection, is provided with $(M+1)$ taps $P_0$ through $P_M$ at which appear $(M+1)$ variously delayed versions of the incoming wave, denoted $$f(t - k\Delta\tau)$$

$k = 0, 1 \ldots M$, corresponding to samples of $f(t)$ at the sample points $k\Delta\tau$ specified by Equation 4b. As explained above, the specified locations of the individual taps of delay line 10 and the length of delay line 10 are determined in accordance with the sampling theorem.

Each of the variously delayed samples appearing at the taps of delay line 10 is applied to the input terminal of a corresponding weighting circuit 101–0 through 101–M, respectively. Weighting circuits 101–0 through 101–M serve to weight the amplitudes of the corresponding samples $f(t)$ through $f(t - M\Delta\tau)$ by multiplying each sample amplitude by an appropriate value $r(0)$ through $r(M\Delta\tau)$ of a suitable weighting function. The problem of choosing a suitable weighting function is discussed in detail in the above-mentioned Blackman-Tukey article, particularly at pages 499 through 504 of volume 37, Bell System Technical Journal (1958).

As an example of a suitable weighting function, the hamming weighting function is given by $$r(k\Delta\tau) = 0.54 + 0.46 \cos \frac{\pi(k\Delta\tau)}{\tau_{\max}} \qquad (5)$$

so that the individual values of $r(k\Delta\tau)$ are determined by the location of the sample points, $k\Delta\tau$. If desired, weighting circuits 101–0 through 101–M may be resistors having resistance values proportional to discrete values of $r(k\Delta\tau)$ at delay times 0 through $M\Delta\tau$; however, it is to be understood that other circuit arrangements may be employed to adjust the amplitudes of the samples of $f(t)$ in accordance with selected values of $r(k\Delta\tau)$.

The amplitudes of the signals developed at the output terminals of weighting circuits 101–0 through 101–M represent weighted samples $r(k\Delta\tau)f(t - k\Delta\tau)$, $k = 0, 1 \ldots M$. In order to obtain signals representative of the imaginary and real parts of the short-time Fourier transform, $F(\omega, t)$, it is necessary to modify further the amplitude of each of these samples by multiplying each weighted sample by an appropriate sine and cosine function, as specified by Equations 4b and 4e. Thus the weighted sample signals from circuits 101–1 through 101–M are simultaneously applied to a first group of corresponding multipliers 102–1 through 102–M for multiplication by appropriate cosine function signals and a second group of corresponding multipliers 103–1 through 103–M for multiplication by appropriate sine function signals. No multipliers are provided for the output signal $r(0)f(t)$ because the sine of zero is equal to zero, while the cosine of zero is equal to unity, hence multiplication by zero reduces the amplitude of $r(0)f(t)$ to zero, while multiplication by unity does not affect the amplitude of $r(0)f(t)$.

Appropriate sine and cosine function signals are generated in this invention in accordance with Equations 4b and 4e. By way of illustration, the ith term on the right-hand side of Equation 4b may be written $$r(i\Delta\tau)f(t-i\Delta\tau)\cos\,(i\alpha\Delta\tau t)+r(i\Delta\tau)f(t-i\Delta\tau)$$
$$\sin\,(i\alpha\Delta\tau t)=r(i\Delta\tau)f(t-i\Delta\tau)[\cos\,(i\alpha\Delta\tau t)$$
$$+\sin\,(i\alpha\Delta\tau t)] \quad (6)$$

From Equation 4b it is apparent that the real part of $F(\omega, t)$ is given by the sum of the cosine terms, so that if the real part of $F(\omega, t)$ is denoted by $R[F(\omega, t)]$, then $$R[F(\omega, t)]=r(0)f(t)\cos\,(\Omega_0 t)$$
$$+r(\Delta\tau)f(t-\Delta\tau)\cos\,(\Omega_1 t)$$
$$\cdot\quad\cdot\quad\cdot\quad\cdot$$
$$r(M\Delta\tau)f(t-M\Delta\tau)\cos\,(\Omega_M t) \quad (7)$$

while the imaginary part of $F(\omega, t)$, denoted by $I[F(\omega, t)]$, is given by the sum of the sine terms, $$I[F(\omega, t)]=r(0)f(t)\sin\,(\Omega_0 t)$$
$$+r(\Delta\tau)f(t-\Delta\tau)\sin\,(\Omega_1 t)$$
$$\cdot\quad\cdot\quad\cdot\quad\cdot$$
$$r(M\Delta\tau)f(-M\Delta\tau)\sin\,(\Omega_M t) \quad (8)$$

To obtain a signal representative of the real part of $F(\omega, t)$, therefore, the amplitude of each of the weighted sample signals $r(\Delta\tau)f(t-\Delta\tau)$ through $r(M\Delta\tau)f(t-M\Delta\tau)$ is multiplied by an appropriate time varying cosine function signal specified by the terms in expression (7) above, and after multiplication by the cosine signals, the products are added together with the weighted sample, $r(0)f(t)$, to form a signal representative of the real part of $F(\omega, t)$. As shown in FIG. 1, appropriate cosine function signals are supplied by cosine function generators 104–1 through 104–M, which may be of any desired construction; for example, generators 104–1 through 104–M may be of the type described in W. J. Karplus and W. W. Soroka, Analog Methods, page 96 (2d ed., 1959).

The radian frequencies, $\Omega_k$, of the cosine function signals are specified in accordance with Equation 4e, and the cosine function signals produced by generators 104–1 through 104–5 are multiplied together with the corresponding weighted sample signals from weighting circuits 101–1 through 101–M in multipliers 102–1 through 102–M to obtain product signals having amplitudes representative of the terms in expression (7) above. The product signals developed at the output terminals of multipliers 102–1 through 102–M are combined in adder 108, together with the weighted sample signal $r(\tau_0)f(t)$ from weighting circuit 101–0, to form at the output terminal of adder 108 a signal proportional to the real part of the short-time Fourier transform of the incoming signal.

A signal representative of the imaginary part of the short-time Fourier transform of the incoming signal is obtained by multiplying the amplitude of each of the weighted sample signals $r(k\Delta\tau)f(t-k\Delta\tau)$, $k=0, 1 \ldots, M$, by an appropriate time varying sine function signal supplied by sine function generators 105–1 through 105–M. Sine function generators 105–1 through 105–M, which may also be designed in accordance with the description given in the above mentioned Analog Methods text, produce since function signals representative of the sine functions appearing in the various terms in expression (8) above, and each of these sine function signals is delivered to one of the input terminals of an associated multiplier 103–1 through 103–M, respectively, while the other input terminal of each multiplier receives an appropriate weighted sample signal from the corresponding weighting circuit. Each multiplier develops at its output terminal a product signal with an amplitude representing one of the terms in expression (8) above, and these product signals are combined in adder 109 to form at the output terminal of adder 109 a signal proportional to the imaginary part of the short-time Fourier transform of the incoming signal.

The present invention also provides apparatus for obtaining the short-time power spectrum of a time function. To obtain the short-time power spectrum, the real and imaginary parts of the short-time Fourier transform are combined according to the following definition, $$G(\omega, t) \equiv \left|\int_0^{\tau_M} r(t)f(t-\tau)\cos\,(\omega\tau)d\tau\right|^2$$
$$+\left|\int_0^{\tau_M} r(t)f(t-\tau)\sin\,(\omega\tau)d\tau\right|^2 \quad (9)$$

where $G(\omega, t)$ denotes the short-time power spectrum of $f(t)$. By denoting the real part of the short-time spectrum $R[F(\omega, t)]$ and the imaginary part $I[F(\omega, t)]$, Equation 9 may be rewritten $$G(\omega, t)=|R[F(\omega, t)]|^2+|I[F(\omega, t)]|^2 \quad (10)$$

The short-time power spectrum may therefore be obtained by deriving the absolute value of each of the short-time Fourier transform signals appearing at the output terminals of adders 108 and 109 in the apparatus shown in FIG. 1, squaring each of the absolute value signals, and adding the squared absolute value signals.

Apparatus for deriving a signal representative of the short-time power spectrum in accordance with Equation 10 is illustrated in FIG. 2. A signal indicative of the real part of a short-time Fourier transform is applied to the input terminal of a first subpath containing absolute value circuit 30a followed by squaring circuit 31a, while a signal representative of the imaginary part of a short-time Fourier transform is applied to the input terminal of a second subpath containing absolute circuit 30b followed by squaring circuit 31b. Absolute value circuits 30a and 30b may be of any desired construction, for example, they may be designed as shown in W. J. Karplus and W. W. Soroka, Analog Methods, pages 75 and 76 (2d ed., 1959). Similarly, squaring circuits 31a and 31b are conventional arrangements for raising an input signal to the second power; for example, see pages 78 through 81 of the above-mentioned Karplus and Soroka text. The output signals of the two subpaths are proportional to the squared absolute values of the real and imaginary parts of the short-time Fourier transform, and by combining the output signals of the two subpaths in adder 32 there is formed at the output terminal of adder 32 a signal representative of the short-time power spectrum.

It is to be understood that applications of the principles of this invention are not limited to the analysis of speech waves, but may include analysis of the spectra of other complex waves as well. In addition, it is to be understood that the above-described embodiments are merely illustrative of the numerous arrangements which may be devised for the principles of this invention by those skilled in the art without departing from the spirit and scope of the invention.

What is claimed is:

Apparatus for analyzing the Fourier transform of a time wave which comprises a source of an incoming time wave, $f(t)$, means for delaying said time wave by predetermined amounts of time to obtain a plurality of variously delayed samples of said wave, $$f(t-k\Delta\tau), k=0, 1 \ldots M$$

means supplied with said plurality of samples for individually adjusting the amplitude of each sample by a predetermined amount $r(k\Delta\tau)$ to form a corresponding predetermined plurality of $(M+1)$ weighted samples of said wave, $r(k\Delta\tau)f(t-k\Delta\tau)$, first multiplying means for multiplying the amplitude of each of said weighted samples by a time varying cosine signal, $\cos(\Omega_k t)$, where $\Omega_k = k(\Delta W/M)$, $k=0, 1 \ldots M$, in which $\Delta W$ denotes a frequency interval extending from a selected low frequency in the spectrum from said incoming signal, $f(t)$, to a selected high frequency such that $\Omega_k$ varies in discrete steps from zero to W and the radian frequencies of said time varying cosine signals accordingly vary as linear functions of the frequency of said incoming signal, to produce a first plurality of M product signals, $r(k\Delta\tau)f(t-k\Delta\tau)\cos(\Omega_k t)$, $k=0, 1 \ldots M$, second multiplying means for multiplying the amplitude of each of said weighted samples $r(\tau_1)f(t-\tau_1)$ through $r(\tau_M)f(t-\tau_M)$ by a time varying signal $\sin(\Omega_k t)$, where $\Omega_k = k(\Delta W/M)$, $k=0, 1 \ldots M$, such that $\Omega_k$ varies in discrete steps from zero to W and the radian frequencies of said time varying sine signals accordingly vary as linear functions of the frequency of said incoming signal, to produce a plurality of M product signals, $r(k\Delta\tau)f(t-k\Delta\tau)\sin(\Omega_k t)$, $k=0, 1 \ldots M$ means for additively combining said weighted sample $r(0) \cdot f(t)$ and said first plurality of product signals to develop a first sum signal representative of the real part of a selected short-time Fourier transform of said complex wave, and means for additively combining said second plurality of product signals to develop a second sum signal representative of the imaginary part of said short-time Fourier transform of said complex wave.

References Cited

UNITED STATES PATENTS

| | | | |
|---|---|---|---|
| 2,941,148 | 6/1960 | Catherall | 324—106 |
| 3,026,475 | 3/1962 | Applebaum | 324—77 |
| 3,045,180 | 7/1962 | Losher | 324—77 |
| 3,069,507 | 12/1962 | David | 179—1 X |

RUDOLPH V. ROLINEC, *Primary Examiner.*

WALTER L. CARLSON, *Examiner.*

P. F. WILLE, *Assistant Examiner.*